July 9, 1946.　　　　G. I. HOLMES　　　　2,403,798

SUMMER-WINTER CONTROL INSTRUMENT

Filed May 4, 1942　　　　2 Sheets-Sheet 1

INVENTOR.
Gifford I. Holmes
BY George H. Fisher
Attorney

July 9, 1946.  G. I. HOLMES  2,403,798
SUMMER-WINTER CONTROL INSTRUMENT
Filed May 4, 1942  2 Sheets-Sheet 2
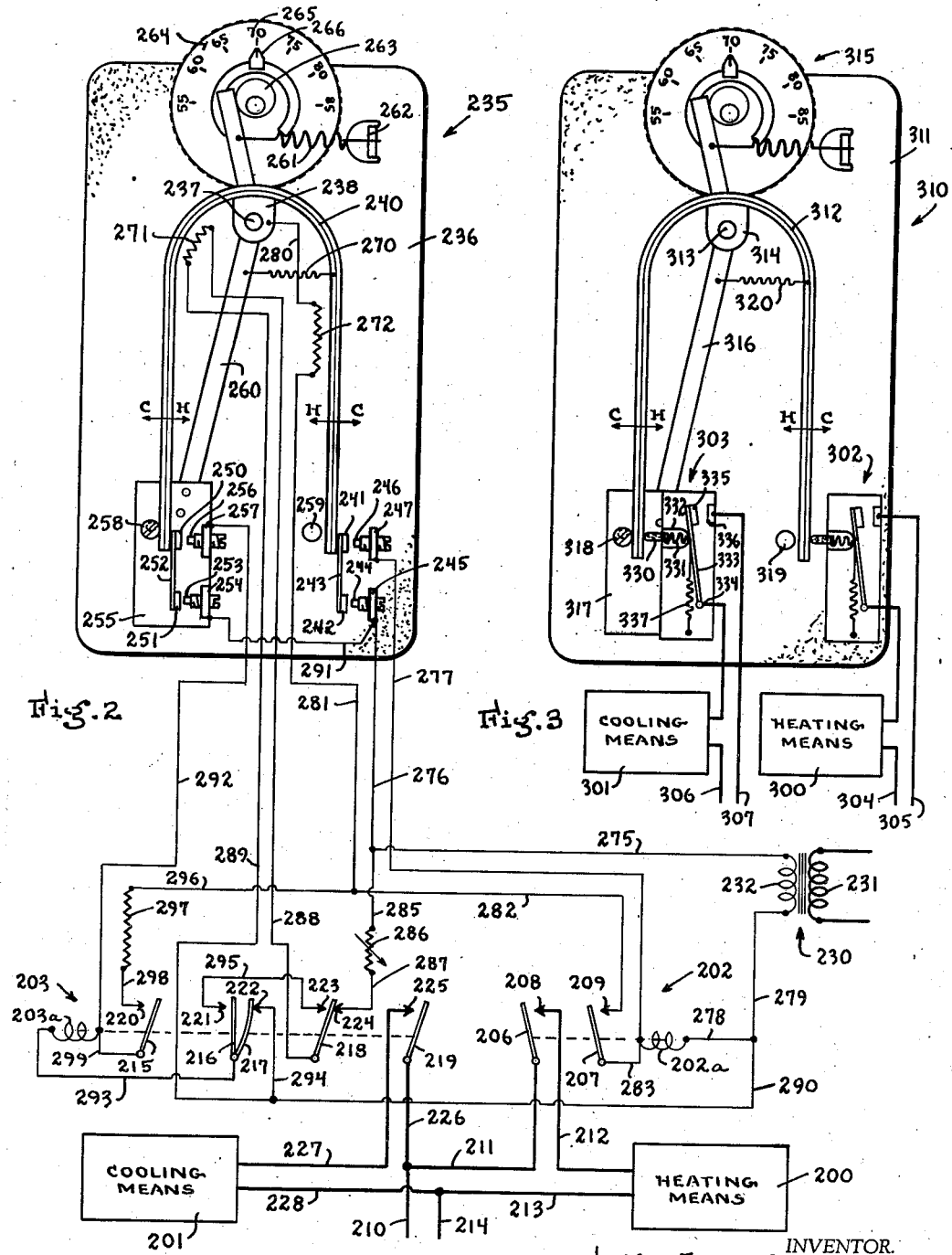
INVENTOR.
Gifford I. Holmes
BY George H. Fisher
Attorney Patented July 9, 1946

2,403,798

UNITED STATES PATENT OFFICE 2,403,798

SUMMER-WINTER CONTROL INSTRUMENT

Gifford I. Holmes, Minneapolis, Minn., assignor to Minneapolis-Honeywell Regulator Company, Minneapolis, Minn., a corporation of Delaware Application May 4, 1942, Serial No. 441,648

13 Claims. (Cl. 257—3)

This application is a continuation in part of my copending application Serial No. 301,900 filed October 30, 1939, as to all matter common to the two applications. The subject matter of these related applications and common to both, involves improvements in thermostatic devices. Application Serial No. 301,900 has become Patent No. 2,309,193, dated Jan. 26, 1943.

The present invention relates to summer-winter control instruments and more particularly to such instruments and the circuits therefor embodying novel means for obtaining automatic change-over from heating to cooling and vice versa.

In heating and cooling control it is conventional practice to make use of a plurality of controlling instruments together with manual means for changing control from one to the other thereof at different seasons of the year. Such systems therefore comprise some duplication of parts. A further disadvantage of present systems resides in this need for manual change-over. In the spring and fall of the year in some sections of the country, both heating and cooling may be needed in the same day, or from day to day. Hence, the householder must operate the change-over means a great number of times in order to obtain the desired operation of the heating and cooling means.

In the prior art it has become more and more common to supply both heating and cooling in buildings and in dwellings. In these heating and cooling systems it has become a conventional practice to equip the systems with a plurality of controls. These controllers take the form of thermostats. The first of the controllers may control the cooling system and the second controller would control the heating system. In the event that it is desired to change from heating to cooling, it is necessary to give manual attention to the system to either place one or the other of the controllers into control. Because of the complicated nature of some of these systems it has been found necessary to give skilled attention to the control systems. For this reason the systems have not met with ready approval under many circumstances.

An example of the undesirability of heating and cooling systems needing manual change-over is in the domestic air conditioning field. Here the controller is placed within the dwelling space in the building and the occupants thereof usually adjust the control means from time to time to the desired setting. If two controls were employed for a manual change-over switch, it is conceivable that the occupants of the dwelling might adjust the heating means below the cooling means with the result that both would be in operation simultaneously.

Another feature that has been found highly desirable in heating and cooling systems is that feature known as delayed heating or cooling anticipation. This type of function in a system, consider heating for example, is that after the thermostat has called for heat and a slight rise in temperature occurs in the space, the operation of the thermostat will be accelerated to thereby open the control contacts to terminate operation of the burner. Such operation will anticipate the delivery of heat to the space prior to the actual delivery thereof. With such a system overshooting in the space is prevented.

Upon operating on the cooling cycle it is desirable when the space begins to cool to speed up or accelerate the operation of the thermostat to cause the cooling means to be deenergized and thus anticipate the cooling in the space to thereby prevent over-shooting.

Another desirable feature in a thermostat of the nature set out above is in automatic change-over from heating to cooling, and vice versa. With this automatic change-over during the spring and fall of the year, when heating and cooling may be needed from day to day or at different times during the same day, the cooling devices will automatically energize either the cooling or the heating means as indicated by the temperature affecting the bimetallic element.

It is, therefore, an object of the present invention to provide a heating and cooling system having automatic change-over control means.

A further object of the present invention is to provide an automatic change-over control means utilizing snap action switch means for energizing either the cooling or the heating means.

Another object of the present invention is to provide an automatic change-over switch with heating anticipation when the device is operating on the heating cycle and cooling anticipation when the device is operating on the cooling cycle.

A further object is to provide a novel type of cooling anticipation to a system for controlling a cooling means.

Another object is to provide an automatic change-over switch with heating means whereby the device will have a very small change-over temperature differential.

The above and other objects will be apparent in the accompanying specification and claims.

In the drawings,

Figure 2 is a diagrammatical view of a modification thereof.

Figure 1:
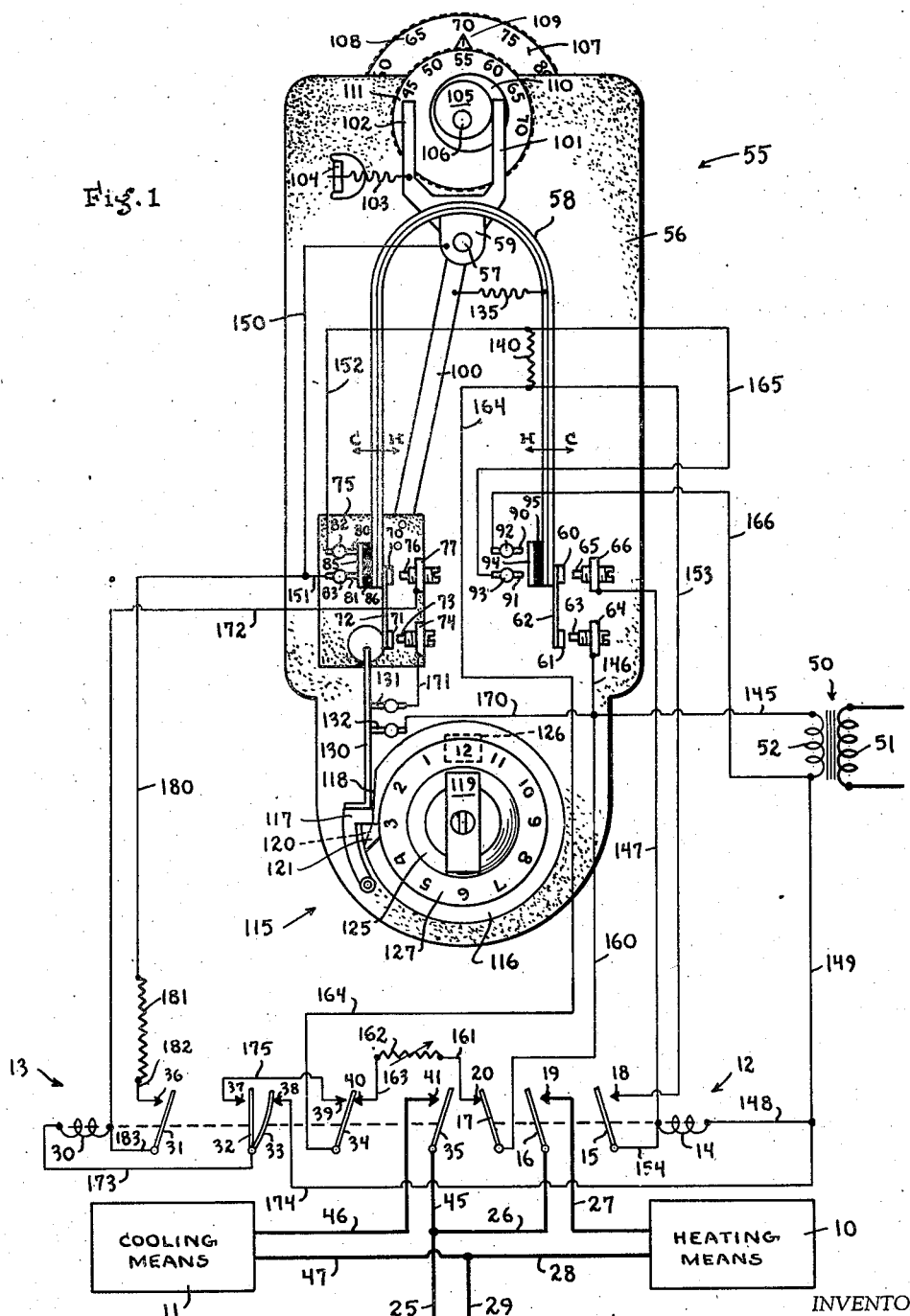
Figure 1, is a diagrammatical view of one embodiment of my invention.

And Figure 3 is a diagrammatical view similar to Figure 1, but of a modification thereof.

Referring first to Figure 1, a heating means 10 and a cooling means 11 are controlled by relays 12 and 13, respectively. The heating relay 12 comprises a winding 14 which when energized through circuits to be hereinafter traced pulls in relay arms 15, 16 and 17. These relay arms cooperate with stationary contacts 18, 19 and 20, respectively. Suitable biasing means are provided for return of the said relay arms to the position shown in Figure 1 upon the deenergization of the winding 14. The contacts 16 and 19 are in control of the heating means 10 and a circuit therefor may be traced as follows: from the line wire 25 through conductor 26, relay arm 16, contact 19, conductor 27, the heating means 10 and the conductor 28 back to the other line wire 29. It is seen therefore that when the relay winding 14 is energized a circuit for placing the heating means in operation is closed.

The relay 13 comprises a winding 30 which when energized moves movable contacts 31, 32, 33, 34, and 35 toward the left. These contacts cooperate with stationary contacts 36, 37, 38, 39, 40, and 41, respectively. Suitable biasing means are provided for return of the said relay arms or movable contacts to the position shown in Figure 1 upon the deenergization of the winding 14. The movable contact arm 35 and the stationary contact 41 control the operation of the cooling means 11. When contact 41 is engaged by the arm 35 a circuit for the cooling means 11 may be traced as follows: from the line wire 25 through conductor 45, relay arm 35, contact 41, conductor 46, cooling means 11, and conductor 47 back to the other line wire 29. From tracing the foregoing circuit it is seen that when the relay winding 30 is energized that a circuit for the cooling means is completed so that the cooling means 11 will be placed into operation.

Energy for actuating the relays 12 and 13 is supplied from a transformer generally indicated by the reference character 50. The transformer 50 comprises a primary winding 51 and a low voltage secondary winding 52. Also in control of these relays is a control device generally indicated by the reference character 55.

The control device 55 comprises a base 56 having a pivot post 57 secured thereto. Upon the post 57 a bimetallic member 58 is freely mounted by a bracket 59. The bimetallic member 58 is arranged so that upon a temperature decrease the ends of the bimetal member 58 will tend to move apart and upon an increase in temperature these ends will move closer to each other. Upon the lower right-hand end of the bimetallic strip 58 are carried a plurality of movable heating control contacts 60 and 61, respectively. The contact 61 is mounted upon a resilient strip 62 so that the contact 61 may be pushed back to permit engagement of the contact 60 with its stationary contact for a purpose to be hereinafter more fully pointed out. The contact 61 cooperates with a stationary contact 63 which is mounted upon a conducting bracket 64 which may extend out from the rear of the base 56. The movable contact 60 cooperates with a stationary contact 65 which is carried upon a conducting bracket 66 which likewise may extend upwardly from the rear of the base 56.

At the lower left-hand end of the bimetal strip 58 are a pair of movable cooling control contacts 70 and 71. The contact 71 is mounted at the lower end of a resilient strip 72 so that contact 71 may be pushed back when engaging its stationary contact to permit engagement of contact 70 with its stationary contact. The contact 71 cooperates with a stationary contact 73 carried upon a bracket 74 which is in turn mounted to a movable insulating panel 75. The movable contact 70 cooperates with a stationary contact 76 which is secured to a bracket 77 also carried by the panel 75.

A pair of adjustable abuttable contacts 80 and 81 are suitably mounted on posts 82 and 83, respectively, which are secured to the movable insulating member 75. The contacts 80 and 81 may be bridged by a conducting plate 85 which is mounted by means of insulation 86 upon the lower left-hand end of the bimetal strip 58. The contacts 80 and 81 when bridged are adapted to complete circuits used in connection with the heating contacts mounted on the lower right-hand end of the strip 58. These contacts may also be adjusted to vary the relative spacing of the heating and cooling contacts, to thus vary the changeover temperature differential. The purpose of these various contacts will be more fully described hereinafter.

A pair of abuttable cooling control contacts 90 and 91 are suitably mounted upon posts 92 and 93, respectively. The contacts 90 and 91 are adapted to be bridged by a conducting plate 94 which is mounted upon an insulating piece 95 carried by the lower right-hand end of the thermal strip 58. The contacts 90 and 91 when bridged are adapted to cooperate with circuits controlled by the cooling contacts carried by the lower left-hand end of the bimetal strip 58. The operation of this portion of the controller will be hereinafter more fully described.

The insulating panel 75 is adapted to be moved either to the right or to the left by its mounting arm 100 which is pivoted on the post 57. The purpose of moving the arm 100 to thereby move the insulating panel carrying the stationary contacts as well as the abuttable contacts is so that an adjustment for the device may be obtained. The upper end of arm 100 is bifurcated to form a pair of fingers 101 and 102. The finger 102 is biased to the left by a spring 103 which at its other end is secured to an upturned ear 104 on the base 56. The spring 103 normally biases the finger 101 into engagement with a day adjustment cam 105. The cam 105 is non-rotatably fixed upon a post 106 which in turn may be rotated by an adjustment dial 107 carrying temperature indicia 108. The indicia 108 cooperates with a pointer 109 to indicate the position of the day adjustment cam 105. As the adjustment dial 107 is rotated, the cam 105 will be rotated to a similar degree to thereby vary the position of the finger 101 and hence the position of the arm 100. When the adjustment dial 107 is moved in a counter-clockwise direction the finger 101 will move to the left. Movement to the left of the finger 101 will cause the arm 100 to be moved toward the right. With such adjustment it is seen that the bimetal strip 58 will have to heat up before it will actuate any of the contacts carried by its lower left-hand end. Hence, it is seen that an adjustment to increase the control setting of the device is obtained. Moving the dial 107 in the opposite direction conversely lowers the control point.

A night adjustment cam 110 is suitably secured to a night adjustment dial 111 carrying indicia similar to the dial 107. The finger 102 cooperates with the cam 110 to determine the position to which the thermostatic strip 58 is moved for shut-down operation during certain portions of the day, usually at night time.

A spring operated time motor for shifting the device over from day to night operation is generally indicated by the reference character 115. The timing motor comprises a suitable spring operated clockwork, not shown, which rotates a cam member 116. The cam is adapted to move a cam follower 117 to one of two positions. The cam follower 117 is shown in a drop-off portion 118 which is the normal position for the follower during the day time. When the cam 116 is rotated to the right by turning a winding knob 119, the cam follower 117 will ride up a surface 120 whereupon a drop-off piece 121 which is biased into the position shown in the drawings will be pushed back until the cam follower 117 passes the riser portion 120.

The time motor 115 is designed so that it may be set by turning a manual knob 125 at the time of setting so that the hour of the day registers with a window in the case indicated in broken lines at 126. After this adjustment is made, the winding knob 119 is rotated in a clockwise direction so that the cam follower 117 will drop into the drop-off portion 118 at a second predetermined time. For example, it might be assumed that it is twelve o'clock in the evening at the position of the parts shown in the drawings. Now assume it is desired for the morning pickup period for the thermostat 58 to begin at six o'clock in the morning. The winding knob 119 would merely be turned around until the numeral 6 carried on a dial 127 appeared in the window 126. With such adjustment of the clock mechanism 115 it would take six hours before the cam follower 117 would drop into the lower detent portion 118.

The cam follower 117 carries a resilient arm 130. When the spring arm 130 is in the position shown it is adapted to permit the spring 103 connected to the adjustment finger 102 to move the adjustment finger 101 into engagement with a day adjustment cam 105. Hence, when the cam follower 117 is in the position shown, the thermostat 58 will control under the day setting determined by the adjustment of the cam 107.

When the arm 130 is in the position shown, a pair of contacts 131 and 132 are bridged by a portion thereof. It will be understood that the contacts could be bridged by some suitable pressed back contact structure carried upon the arm 130 if desired. When the contacts 131 and 132 are bridged the circuit for the cooling cycle is placed in condition for control by the thermostat as will be hereinafter more fully described. When the cam follower 117 rides up onto the high surface of the cam 116, the spring arm 130 is moved toward the left. Movement of the arm 130 toward the left will move the insulating panel 75 toward the left. The amount of movement of the panel 75 will be determined now by the adjustment of the night setting cam 110. When the arm 100 is rotated toward the left the adjustment finger 102 thereof will move into engagement with the adjustment cam 110. The spring arm 130 is strong enough to overcome the spring 103 connected to the arm 102 so the adjustment finger 102 will move into engagement with the cam 110 which will determine the night adjustment for the thermostat 55. Upon moving the spring arm 130 to the left in the manner above described, the contacts 131 and 132 will be unbridged. The purpose of this action is to prevent operation of the cooling means when shutting down the temperature at night. A second purpose for unbridging the contacts 131 and 132 is to give night shut down when the device is operating on its cooling cycle so that the cooling means may be placed out of operation during a desired portion of the day.

A small spring 135 is connected to the right-hand leg of the bimetal strip 58 and to the adjusting arm 100. The spring 135 exerts sufficient force upon the bimetal strip 58 so as to tend to turn the same on the pivot 57 in a clockwise direction causing the abutting contacts 80, 81 or the contacts 90 and 91 to be engaged with sufficient pressure to give good electrical contact. However, the spring 135 does not exert sufficient force to substantially vary the operation of the bimetallic strip 58. A heater 140 is arranged so as to affect the bimetallic strip 58 by means of local heating under certain circumstances. In actual construction of the device the heater 140 might take the form of a plug mounted upon the pivot 57 to affect equally both sides of the bimetal 58. However for purposes of illustration, the heater 140 is shown diagrammatically as being arranged adjacent only the right-hand side of the bimetal strip 58.

*Heating operation*

The operation of the device upon controlling the heating means 10 will now be described. When the ambient temperature affecting the thermostatic strip 58 decreases the ends thereof will tend to spread apart. Spreading apart of the ends of the thermostatic strip 58 causes the abuttable contacts 80 and 81 to be bridged by the conducting plate 85. The spring 135 biases the bimetal 58 as a whole in a clockwise direction towards the left so that this action will take place first. Thereafter, upon further cooling of the thermostatic strip 58 the lower right-hand end thereof will move toward the right. The movable contact 61 will first engage its stationary contact 63. At this time however, no circuit is completed for the relay winding 14 because the movable contact arm 15 of the relay 12 will be out of engagement with its stationary contact 18 and there will be no circuit to the relay coil 14. Upon further cooling of the thermostatic strip 58, the contact 60 will engage the stationary contact 65. At this time a circuit for the relay winding 14 of the relay 12 may be traced from the transformer secondary 52 as follows: from wire 145 through wire 146, contact bracket 64, stationary contact 63, movable contact 61, flexible strip 62, contact 60, stationary contact 65, conducting bracket 66, wire 147, relay winding 14, wire 148 and wire 149 back to the other side of the transformer secondary 52. Energization of the relay winding 14 causes the movable contacts 15, 16 and 17 to be moved towards the right and results in engagement of the contacts 18 and 19 by their respective movable contact arms 15 and 16. Engagement of contacts 16 and 19 will cause energization of the heating means through the circuit previously traced.

Operation of the heating means 10 will result in an increase in temperature in the space in which the thermostat 55 is located. After the temperature of the space rises slightly the movable contact 60 will move out of engagement with its stationary contact 65 but the contact 61 will remain in engagement with its contact 63 because of the pressback due to its mounting on the resilient blade 62.

At the time contacts 60 and 65 separate, a holding circuit for the relay winding 14 of the relay 12 may be traced as follows: from the transformer secondary 52 through wires 145, 146, bracket 64, contacts 63 and 61, flexible blade 62, bimetal strip 58, mounting bracket 59, wire 150, wire 151, abuttable contact 81, bridge 85, contact 80, wire 152, heater 140, wire 153, contact 18, contact blade 15, wire 154, relay winding 14, wire 148 and wire 149 back to the other side of the transformer secondary 52. It will be noted that this circuit includes the heater 140 adjacent the bimetal strip 58. Although this circuit including this heater is closed immediately when the relay 12 pulls in, the resistance 140 will be shunted out by the contacts 60 and 65 so that this heater will not be brought into operation until after contacts 60 and 65 are opened.

The heater 140 may be so selected so as to give substantially three degrees of heat to the bimetallic strip 58. Hence, after the contacts 60 and 65 open and the circuit previously traced including the heater is in control of the relay 12 a certain amount of heat will be given off to the bimetal. This will result in a speed up in operation of the bimetallic strip 58 in a heating direction which will tend to open the contacts 61 and 63 to deenergize the heating relay 12. Deenergization of the heating relay 12 will result in shutting off of the heating means. From the foregoing it is seen that I have provided a delayed heat anticipation action on the heating cycle.

For night shut down while operating on the heating side of the system, the clock mechanism 115 is adjusted at some desired time at night to pick up again at a predetermined time in the morning. To adjust the device, the knob 119 is rotated in a clockwise direction to move the cam follower 117 and the spring blade 130 connected thereto toward the left. This will result in shifting the insulating panel 75 carried upon the adjustment arm 100 toward the left. It will also result in opening the contacts 131 and 132 to the cooling system so that the cooling means will not be started during this time. Moving of the panel 75 toward the left will make it necessary for the thermostatic strip 58 to expand more or in other words to cool further before closing contacts 60—65 to start the heating operation. Hence, it is seen that the thermostatic strip 58 will now control at a low temperature which is determined by the adjustment of the night shut-down cam 111. Otherwise, the operation of the heating relay 12 is identical to that discussed hereinbefore. In other words, the last to make contacts 60 and 65 must close before the relay winding 14 is energized and the last to open contacts 61 and 63 which are in circuit with the heater 140 control the holding circuit to the relay 12. Therefore, it is seen that the present device gives delayed heat anticipation on both day and night operation.

When the winding 14 of the heating relay 12 is energized, the movable contact 17 moves out of engagement with an "out" contact 20. The reason for this is to prevent a holding circuit from being set up for the heat control relay winding 14 which would be independent of the movable heating thermostatic contacts 60 and 61.

Changeover operation

If the thermostatic strip 58 is heated up indicating that the ambient temperature is rising due to external conditions, for example the outdoor temperature, the lower right-hand end of the bimetallic strip 58 will move toward the left. After moving through a predetermined range of movement, for example 3° temperature change after the contact 61 moves out of engagement with the stationary contact 63, the bridge piece 94 will engage the abuttable contacts 90 and 91. At this time a circuit for the heater 140 may be traced as follows: from the transformer secondary 52 through wire 145, wire 160, relay arm 17, "out" contact 20 of relay 12 which is deenergized at this time, wire 161, a variable resistance 162, wire 163, "out" contact 40 of the cooling means control relay 13, contact arm 34, wire 164, heater 140, wire 165, abuttable contact 91, bridge piece 94, contact 90, and wire 166 back to the other side of the transformer secondary 52. On tracing the above circuit, it is seen that the heater 140 is energized and as previously discussed, is adapted to supply substantially 3° of heat to the bimetal strip 58. Additional heat being applied to the strip 58 will result in the movable contacts 70 and 71 carried at the lower left hand end thereof moving into engagement with their respective stationary contacts. By such operation, it is seen that I have provided a switch changeover device which is substantially capable of controlling either heating or cooling at approximately the same temperature.

On changeover in the opposite direction heat is removed from the bimetal 58 when the bridge plate 94 separates from contacts 90 and 91 to thereby speed up cooling action of the bimetal.

Cooling operation

When the movable contact 71 carried upon the flexible contact mounting strip 72 at the lower left hand end of the bimetallic strip 58 moves into engagement with its stationary contact 73, no circuit will be established for the relay 13 because the holding contacts 36 and 31 of the relay 13 will not at this time be in engagement. However, when the movable contact 70 engages the stationary contact 76 an energizing circuit for the relay winding 30 of the relay 13 may be traced as follows: from transformer secondary 52 through wire 145, wire 170, contact 132, spring 130, contact 131, wire 171, conducting bracket 74, contact 73, contact 71, resilient arm 72, contact 70, stationary contact 76, conducting bracket 77, wire 172, relay winding 30, wire 173, relay arm 33, "out" contact 38, wire 174, and wire 149 back to the other side of the transformer secondary 52. The above traced circuit will cause pulling in of the relay 13 and engagement of the relay arm 35 with its stationary contact 41 as well as all of the other left-hand stationary contacts of the relay. Engagement of contacts 35 and 41 will result in energization of the cooling means 11 through the circuit hereinbefore traced for said means.

It will be noted that the heater 140 is energized upon the bridging of the contacts 90 and 91 by the plate 94 prior to the energization of the cooling means 11. Moreover it will be seen that when relay coil 30 is energized and the cooling means thereby placed in operation the heater 140 remains energized through a new circuit as follows: from the transformer secondary 52 through wires 145 and 170, contact 132, spring 130, contact 131, wire 171, contact bracket 74, contacts 73 and 71, contact carrying blade 72, contacts 70 and 76, contact bracket 77, wire 172, relay winding 30, wire 173, relay arm 32, contact 37, wire 175, contact 39, relay arm 34, wire 164, heater 140, wire 165, contact 91, bridge piece 94, contact 90, and wire 166 back to the other side of the transformer secondary 52. The original relay circuit was broken at 33—38 and the previously traced original circuit for heater 140 was broken at 34—40 upon initial energization of relay coil 30.

From tracing the foregoing circuits it will be seen that the variable resistance 162 which was in series with the heater 140 when the relay 13 was deenergized is now not in the circuit. The variable resistance 162 is so selected that its impedance will be approximately the same as either of the relay windings 30 or 14. The reason for this is so that the resistance 140 will give approximately the same heating, for example 3°, whether the relay winding 14 is in series therewith or the relay winding 30, or the variable resistance 162. By this structure it is seen that an exact temperature can be supplied to the bimetal under different conditions and under different controlling operations in heating and cooling. With the cooling means in operation, bimetal element 58 will cool and first open contacts 70—76.

When the contact 70 leaves its stationary contact 76 it is desirable to have less heat generated by the heater 140 affect the bimetallic strip 58 to accelerate cooling of the strip. For this reason, I have devised a circuit which places a larger resistance in the holding circuit after the contact 70 separates from the stationary contact 76. This circuit may be traced as follows: from transformer secondary 52 through wires 145 and 170, contact 132, spring 130, contact 131, wire 171, contact bracket 74, contacts 73 and 71, contact blade 72, bimetallic strip 58, thermostat mounting bracket 59, wire 150, wire 180, a relatively large resistance 181, wire 182, holding contact 36, relay arm 31, wire 183, relay winding 30, wire 173, relay arm 32, contact 37, wire 175, contact 39, relay arm 34, wire 164, heater 140, wire 165, contact 91, bridge 94, contact 90, and wire 166 back to the other side of the transformer secondary 52. It will be noted that in the above circuit the large resistance element 181 is in series with the heater 140. The resistance 181 may be so selected that the current flow through the above traced circuits will be just sufficient to keep the relay winding 30 energized. Hence, the potential drop through the big resistance 181 and the relay winding 30 will be so large that very little heat will emanate from the heater 140. This will remove most of the 3° of heat theretofore furnished the bimetal 58, causing it to cool. This cooling will result in the ends of the bimetal moving in cooling direction to accelerate the opening action between the contacts 71 and 73. Hence, this action might be termed delayed cooling anticipation. Separation of contacts 71 and 73 will of course result in breaking the holding circuit previously traced to deenergize the relay and to cause the cooling means to be deenergized.

It will be noted upon referring again to the energizing circuit for the cooling relay 13 that the coil 30 is energized through an "out" contact 38 engaged by an "out" contact arm 33. It will also be noted that the energized position of the relay depends upon the engagement of relay contact 37 with relay arm 32 and relay contact 39 with arm 34. It is necessary to have certain overlapping in the operation of these relay contact arms. As illustrated in the drawings, the relay arm 34 may be flexible and engage the stationary contact 39 prior to opening of the contact 38. Likewise, the contact 38 is adapted to remain closed until the stationary contact 37 is engaged by the arm 32. Thus it is seen that sufficient overlap is provided so that the relay will be positively energized and remain energized until separation of the holding contacts 71 and 73.

It has been found in practicing the conditioning art that it is sometimes desirable to modify the operation of the system down at night. My novel device not only provides for lowering the temperature at night on the heating cycle in the manner hereinbefore described, but also deenergizes the cooling means at night so as to completely shut off the cooling operation during the night. To accomplish this, it is simply necessary for an operator to rotate the adjustment arm 119 to the desired setting, which operation will cause separate breaking of the circuit through the contacts 131 and 132 which in normal day operation are bridged by the spring member 130. The cam follower 117 is shown in Figure 1 in the position which it normally takes for day operation for the device. Hence, in setting the clock mechanism 115 in the above described manner the circuit to the cooling relay 13 will be broken for a time predetermined by the setting of the clockwork mechanism 115. Such setting will in no way affect the heating contacts inasmuch as they will be moved still further away from the stationary contacts 63 and 65. Hence it is seen that I have provided a device for automatic changeover from heating to cooling control wherein the changeover degree of differential is kept at a minimum and wherein night shut-down may be provided whether operating upon the heating or cooling cycle of the system.

*The modification shown in Fig. 2*

Referring now to Figure 2, a heating means 200 and a cooling means 201 are controlled respectively by a heating relay 202 and a cooling relay 203. The heating relay 202 comprises a relay winding 202a which when energized moves a pair of movable contact blades 206 and 207 into engagement with stationary contacts 208 and 209, respectively. Suitable biasing means are provided whereby the said movable contact blades are returned to the position shown in Figure 2 upon the winding 202a being deenergized. Engagement of contact arm 206 with stationary contact 208 will result in energization of the heating means through the following circuit: from line wire 210 through wire 211, contact arm 206, contact 208, wire 212, heating means 200 and wire 213 back to the other line wire 214.

The cooling relay 203 includes a relay winding 203a which when energized moves relay arms 215, 216, 217, 218, and 219 into engagement with stationary contacts 220, 221, 222, 223, 224, and 225. Suitable biasing means are provided whereby the said relay arms are returned to the position shown in Figure 2 upon the winding 203a being deenergized. Engagement of the contact arm 219 with the stationary contact 225 will result in energization of the cooling means 201 through the following circuit: from line wire 210 through wire 226, contact arm 219, contact 225, wire 227, cooling means 201 and wire 228 back to the other line wire 214.

The heating and cooling relays 202 and 203 receive electrical energy from a transformer generally indicated by the reference character 230 which comprises a high voltage primary 231 and a low voltage secondary 232. The relays 202 and 203 are under the control of a thermostatic device generally indicated by the reference character 235.

The controller 235 comprises a base 236 which may be of insulating material and upon which a pivot post 237 is secured. Freely pivoted upon the post 237 by means of a bracket 238 is a bimetallic strip thermostat 240. At the lower right-hand end of the bimetal strip 240 is carried a pair of movable heating control contacts 241 and 242. The contact 242 is mounted upon a resilient strip 243 so that it may be pressed back after engaging its stationary contact. The contact 242 cooperates with a stationary contact 244 which is carried upon a conducting bracket 245 which may extend to the rear of the base 236. The contact 241 cooperates with a stationary contact 246 which is secured to a conducting bracket 247 which likewise may extend to the rear of the base 236.

At the lower left-hand end of the bimetallic strip 240 are a pair of cooling control contacts 250 and 251. The contact 251 is carried upon a resilient strip 252 so that it may be pressed back when engaging its stationary contact. The movable contact 251 cooperates with a stationary contact 253 carried upon a conducting bracket 254 which is secured to a movable insulating plate 255. The contact 250 cooperates with a stationary contact 256 which is secured to a conducting bracket 257 which likewise may be mounted upon the plate 255.

An adjustable stop 258 is mounted upon the movable plate 255 and is adapted to cooperate with the lower left-hand end of the bimetal and serve as a bearing against which the bimetal may abut and rotate about its pivot 237 so as to operate the heating contacts upon a decrease in temperature as indicated by the legends on the drawing. The stop 258 is made adjustable to vary the effective spacing of the contacts, and hence the changeover temperature differential. A fixed stop 259 cooperates with the lower right-hand end of the bimetallic strip 240 and the strip is adapted to bear thereupon and rotate around its pivot 237 to cause the movable cooling control contacts 250 and 251 to engage the stationary contacts 256 and 253.

An adjustment arm 260 is also pivoted upon the post 237 and is biased for clockwise rotation by a spring 261 which is secured at one of its ends to an ear 262 on the base 236 and secured at its other end to the upper extending portion of the arm 260. The upper part of the arm 260 cooperates with an adjustment cam 263 which may be rotated by an adjustment dial 264 having indicia 265 thereupon which cooperate with a pointer 266 to indicate the setting of the device.

A light spring 270 is secured at one of its ends to the bimetallic strip 240 and at its other end to the adjustment arm 260. The spring 270 urges the bimetallic member 240 as a whole in a clockwise direction to the left so that one or the other of the ends will engage either of the stops 258 or 259. A pair of heaters 271 and 272 are arranged in proximity to the bimetallic strip 240. These heaters are selected to give a predetermined degree of heat to the bimetal under certain operating conditions to be described more fully hereinafter.

*Operation on heating*

When the bimetallic strip 240 is subjected to a decreasing temperature and the device as a whole is operating upon heating, the lower left-hand end of the bimetallic strip 240 will be in engagement with the adjustable stop 258. The lower right-hand end of the bimetal 240 will move toward the stationary contacts 244 and 246. The first contacts to engage will be the movable contact 242 and the stationary contact 244. At this time however, no circuit for the relay coil 202a will be established because of the fact that the contact 209 will not be engaged by the relay arm 207. However, when the movable contact 241 engages its stationary contact 246, a circuit to the relay winding 202a may be traced as follows: from the secondary 232 of the transformer through wire 275, wire 276, bracket 245, contact 244, contact 242, contact strip 243, contact 241, contact 246, bracket 247, wire 277, relay coil 202a, wire 278, and wire 279 back to the other side of the transformer secondary. This circuit will cause the relay to pull in and the relay arms to engage stationary contacts. Engagement of the relay arm 206 with the contact 208 will cause energization of the heating means through the circuit hereinbefore traced.

When the heating means has operated for a suitable length of time, a slight rise in space temperature will occur. Upon a rise in space temperature the contact 241 will separate from the stationary contact 246. However, at this time the contacts 242 and 244 will not be separated inasmuch as they engage slightly before engagement of contacts 241 and 246. Hence, a circuit for maintaining the relay energized until the contacts 242 and 244 separate may be traced as follows: from the secondary 232 of the transformer through wires 275, 276, contact bracket 245, contacts 244 and 242, contact strip 243, bimetallic strip 240, wire 280, heater 272, wires 281 and 282, contact 209, relay arm 207, wire 283, relay winding 202a, wires 278 and 279 back to the other side of the transformer secondary 232. It is noted that in this circuit the heater 272 will be energized and therefore will give heat to the bimetallic strip 240 to speed up its operation in separating contacts 242 and 244. Hence, it is seen that I have provided a delayed heat anticipation action in this circuit. During the period of time that the contacts 241 and 246 for pulling the relay in remain in engagement, the heater 272 will be shunted out and therefore this heater will not affect the operation of the bimetal until after these contacts are separated.

*Operation on cooling*

In order to give a delayed cooling anticipation I have provided means to supply heat to the bimetal at all times except during a certain portion of operation of the cooling means. A circuit for heater 271 which is on at all times except for this period of time may be traced as follows: from the transformer secondary 232 through conductor 275, conductor 285, variable resistance 286, conductor 287, "out" contact 224 of the relay 203, contact arm 218, conductor 288, the heater 271, conductor 289, and conductors 290 and 279 back to the other side of the transformer secondary 232. From this circuit it is seen that when the cooling means are not in operation that a given degree of heat, for example for 3°, may be supplied to the bimetal at all times. It will also be noted that this heater is normally in operation, even when the thermostat is operating the heating means.

Upon an increase in space temperature, the lower right-hand leg of the bimetallic strip 240 will move into engagement with the stop 259. Thereafter the lower left-hand end of the bimetallic strip 240 will move away from its stop 258 and into engagement with the stationary contacts. The first contacts to make as this temperature rise takes place are the movable contact 251 and the stationary contact 253. However, at this time no effect will be had upon the relay.

Upon a further increase in space temperature the movable contact 250 will engage the stationary contact 256. When these last to engage contacts make, an energizing circuit for the relay winding 203a may be traced as follows: from the secondary 232 of the transformer through conductors 275, 276, 291, bracket 254, contacts 253 and 251, contact carrier arm 252, contacts 250 and 256, contact bracket 257, wire 292, relay coil 203a, wire 293, relay arm 217, relay "out" contact 222, wire 294, and wires 290 and 279 back to the other side of the transformer secondary.

Once the cooling relay 203 has been energized, a new relay circuit including the heater 271 may be traced as follows: from transformer secondary 232, wires 275, 276 and 291, contact bracket 254, contacts 253, 251, contact carrier 252, contacts 250 and 256, contact bracket 257, wire 292, relay winding 203a, wire 293, relay arm 216, contact 221, wire 295, contact 223, relay arm 218, wire 288, heater 271, wire 289, and wires 290 and 279 back to the other side of the transformer secondary 232. The original circuit for heater 271 was broken at 218—224, as was the original circuit for relay coil 203a at 217—222, upon the initial energization of relay coil 203a. However, the relay arm 218 upon the initial energization of the winding 203a is adapted to engage contact 223 prior to the opening of the contact 222 by arm 217. Likewise the contact 222 is adapted to remain closed until the stationary contact 221 is engaged by the arm 216. Hence, it is seen that the heater 271, which is energized when the heating relay 203 is deenergized, is also energized when the relay is energized so long as the movable contact 250 remains in engagement with its stationary contact 256.

When contacts 250 and 256 separate indicating that there has been some cooling in the space which results in a slight movement of contact 250 away from contact 256, it is desirable then to remove the heat from the bimetal to give delayed cooling anticipation. Hence, I have provided a further holding circuit having a high resistance so that the effect of the heaters 271 and 272 will be very slight. This circuit may be traced as follows: from the transformer secondary 232 through wires 275, 276, and 291, contact bracket 254, contact 253, and 251, contact arm 252, bimetal strip 240, the mounting bracket 238, wire 280, heater 272, wire 281, wire 296, large resistance 297, wire 298, contact 220, relay arm 215, wire 299, relay winding 203a, wire 293, contact arm 216, contact 221, wire 295, contact 223, relay arm 218, wire 288, the heater 271, wires 289, 290, and 279 back to the other side of the transformer secondary 232. It is seen upon tracing the above circuit that the resistance of both heaters 271 and 272 adjacent to the bimetal 240 are in series with a considerably larger resistance 297. By such an arrangement, the impedance on the circuit is such that the effect of the heaters 271 and 272 upon the bimetal is negligible, for example in the order of one-fourth to one-half of one degree. Hence, the bimetallic member 220 will sense this effective cooling which will result in accelerated movement of the movable contact 251 away from the stationary contact 253. By such structure it is seen that I have provided a novel cooling anticipation type of structure.

It will be noted upon tracing the circuit for heating the bimetal when the cooling relay is deenergized, that this circuit includes the variable resistance 286. The resistance 286 is so constructed that its impedance in this circuit will be substantially the same as the impedance of relay winding 203a. The reason for this is that by such structure the heating to the bimetal 240 when the relay is off will be substantially the same as when the contacts 250 and 256 engage because the impedance in the circuit will be substantially the same.

*The modification shown in Fig. 3*

The device disclosed in Figure 3 will now be described. In Figure 3, I have illustrated a heating means 300 and a cooling means 301. The heating means is controlled by a snap action switch generally indicated by the reference character 302 and the cooling means is controlled by a snap action switch generally indicated by the reference 303. When the contacts in the switch 302 are closed, a circuit is completed for operating a heating means from line wires 304 and 305. When the contacts of the snap switch 303 are closed a circuit for the cooling means is closed from the line wires 306 and 307.

A control device for operating the snap switches 302 and 303 is generally indicated by the reference character 310. The control device 310 comprises a base 311 upon which a bimetallic strip 312 is mounted upon a post 313 by means of a bracket 314. An adjustment means, which is similar in all respects to the adjustment means described in connection with Figure 2, is generally indicated at 315. An adjustment arm 316 carries a plate 317 which mounts a stop 318 for the lower left-hand end of the bimetal and the snap switch 303. A spring 320 biases the bimetallic strip 312 towards the stop 318 as well as toward a stop 319. The stop 319 is adapted to cooperate with the bimetallic strip 312 and serves as an abutment whereupon the strip may bear to actuate the cooling snap switch 303. The adjustable stop 318 may be rotated to vary the differential of change-over of the switch and cooperates with the bimetal in operation of the heating switch 302.

Inasmuch as the snap switches 302 and 303 are identical, only one of them will be described. When operating the cooling means, the bimetal 312 will be heated and the ends will move toward each other. The lower right-hand end of the bimetal will bear upon the abutment 319 and the lower left-hand end will force a plunger 330 inwardly. This plunger 330 builds up a force in a spring 331 which bears at its innermost end upon a movable cup 332, the cup in turn bears against a switch arm 333, which is pivoted at its lower end at 334 and at its upper end carries a movable contact 335. The movable contact is adapted to cooperate with a stationary contact 336 to make and break the circuit to the cooling means 301. A spring 337 biases the switch blade 333 in a counter-clockwise direction with a force which is predetermined by the angle of force application between it and the switch arm 333. Hence, when sufficient force has been built up in the spring 332 by a movement of the plunger 330 toward the right, the switch arm 333 will begin to move in a clockwise direction. The springs 332 and 337 are so selected that the resistance to movement of the switch arm 333 by the spring 337 falls off at a rate more rapid than the decrease in force due to the action of spring 332. Hence, what is known as a spring rate compensation or over compensation snap action is obtained. It will be understood that other snap action structure could also be utilized, for example magnets or overcenter snap switches.

After the contacts 335 and 336 have been made for a sufficient length of time the air affecting the thermostat 312 will become cool and cause the lower ends of the bimetallic strip 312 to separate. This separation will relieve the force in the spring 332 and the force of the spring 337 acting upon the contact arm 333 will cause the arm to snap away and separate the contact 335 from the contact 336, thus shutting off the cooling means.

The heating means switch 302 operates in an identical manner to the operation of the cooling means switch except for the fact that upon cooling the switch 302 is made to energize the heating means and upon heating the switch is opened so that the heating means will be deenergized.

From the foregoing, it will be seen that I have disclosed several modifications of my invention for obtaining both heating and cooling control having an automatic change over and control mechanism for preventing overshooting of the delayed anticipation type. My present invention embodies features which may be found applicable in other control applications, for example limit control or the like. It will be understood, however, while only several embodiments of the invention have been described and illustrated in the drawings, that the invention is not limited thereto, but is capable of a variety of mechanical forms and that changes may be made in the form, details of construction and arrangement of the parts without departing from the spirit of the invention. Reference should therefore be had to the appended claims for definition of the limits of the present invention.

I claim:

1. A heating and cooling system comprising, in combination, heating means, cooling means, first control means for said heating means, second control means for said cooling means, a movable condition responsive means, and a plurality of abutment means for said condition responsive means, said condition responsive means acting upon a first and second of said abutment means to operate said first control means, and upon said second and a third of said abutment means to operate said second control means.

2. In a heating and cooling system, in combination, heating means, cooling means, a circuit therefor, and control means in said circuit comprising a bimetal strip pivoted at a point between its ends, first and second abutment means adjacent said ends, and a pair of switches adjacent said ends, one of said switches being actuated by said strip upon cooling to operate said heating means and the other of said switches being actuated thereby upon heating to operate said cooling means, said strip acting upon the first of said abutment means and rotating about its pivot point to actuate one of said switches, and acting upon the second of said abutment means and rotating about its pivot point to actuate the other switch.

3. In a heating and cooling system, in combination, heating means, cooling means, a circuit therefor, and control means in said circuit comprising a bimetal strip pivoted at a point between its ends, first and second abutment means adjacent said ends, and a pair of snap action switches adjacent said ends, one of said switches being actuated by said strip upon cooling to operate said heating means and the other of said switches being actuated thereby upon heating to operate said cooling means, said strip acting upon the first of said abutment means and rotating about its pivot point to actuate one of said switches, and acting upon the second of said abutment means and rotating about its pivot point to actuate the other switch.

4. In a heating and cooling system, in combination, heating means, cooling means, a circuit therefor, and control means in said circuit comprising a bimetal strip pivoted at a point between its ends, a pair of switches adjacent said ends, one of said switches controlling said heating means and the other of said switches controlling said cooling means, and means for causing automatic changeover from control by one to the other of said switches consisting of abutment means, said abutment means being adjustable for varying the changeover temperature differential.

5. A heating and cooling system of the class described, comprising, in combination, electrically operated heating means, electrically operated cooling means, thermostatic means, switching means operated by the thermostatic means, local electrical heating means for said thermostatic means, means including electrical connections between said switching means, electrically operated heating means and said local heating means operable to energize said electrically operated heating means when the temperature falls to a predetermined value, to additionally energize said local heating means while maintaining said electrically operated heating means energized upon a first rise in temperature from said predetermined value, and to deenergize both said local heating means and said electrically operated heating means upon a still further rise in temperature, second switching means operated by said thermostatic means upon further temperature rise, means including electrical connections between said second switching means and said local heating means to energize the local heating means upon such further rise in temperature, third switching means operated by said thermostatic means upon still further temperature rise, and means including electrical connections between said third switching means, electrically operated cooling means and local heating means to maintain said local heating means energized and to energize said electrically operated cooling means upon such further temperature rise so as to reduce such temperature, to energize said local heating means to a lesser degree while maintaining said electrically operated cooling means energized upon a first temperature fall, and to deenergize said electrically operated cooling means and reenergize said local heating means to the original extent upon still further temperature fall.

6. In a combined heating and cooling system, in combination, a pair of temperature changing means comprising heating means and cooling means, temperature responsive means in control of said heating means and cooling means to operate said heating means at a predetermined low temperature and to operate said cooling means at a predetermined high temperature, means for adjusting said temperature responsive means to change the temperature at which one of said temperature changing means is operated, means to prevent the operation of the other of said temperature changing means, and a single means for operating both said adjusting means and said preventing means.

7. In a combined heating and cooling system, in combination, a pair of temperature changing means comprising heating means and cooling means, temperature responsive means in control of said heating means and cooling means to operate said heating means at a predetermined low temperature and to operate said cooling means at a predetermined high temperature, means for adjusting said temperature responsive means to change the temperature at which one of said temperature changing means is operated, means to prevent the operation of the other of said temperature changing means, and a single manually settable timing means in control of said adjusting means and said preventing means.

8. In combination, a pair of temperature changers comprising a heating means and a cooling means, temperature responsive switching means in control of said heating means and cooling means, means to adjust the temperature at which one of said temperature changers is operated by said temperature responsive switching means, and switching means operated by said adjusting means to prevent operation of the other of said temperature changers by said temperature responsive means.

9. In combination, a pair of temperature changers comprising a heating means and a cooling means, temperature responsive switching means in control of said heating means and cooling means, means to adjust the temperature at which one of said temperature changers is operated by said temperature responsive switching means, switching means operated by said adjusting means to prevent operation of the other of said temperature changers by said temperature responsive means, and manually settable timing means in control of said adjusting means.

10. In a cooling system, electrical means to provide a cooling action when energized, a temperature responsive element, switching means having three switch closing positions operated thereby, said positions comprising a cold position, an intermediate position and a hot position, local electrical heating means for said temperature responsive element, and means including circuit connections between said electrical means, switching means and local electrical heating means arranged to energize said local electrical heating means a predetermined amount when the switching means is in said cold position, said means including circuit connections and switching means being arranged to maintain said energization of said local heating means substantially constant as said switching means are operated through said intermediate position to said hot position by rising temperature and to energize said electrical means to cause cooling when the switching means moves to said hot position, said means including circuit connections coacting with said switching means to continue the operation of said electrical means causing cooling and to diminish the energization of said local heating means upon moving of the switching means out of said hot position due to lowered temperature, the energization of said local heating means remaining substantially diminished until movement of said switching means through said intermediate position upon lowering of the temperature, and to thereupon stop said electrically operated cooling means and reenergize said local heating means said predetermined amount.

11. In a cooling system, electrical means to provide a cooling action when energized, a temperature responsive element, switching means having three switch closing positions operated thereby, said positions comprising a cold position, an intermediate position and a hot position, a local electrical heating means for said temperature responsive element, relay means including switches operated thereby, and circuit connections between said electrical means, switching means, local electrical heating means and relay means arranged to energize said local electrical heating means a predetermined amount when the switching means is in said cold position, said circuit connections, switching means and relay operated switches being arranged to maintain said energization of said local heating means substantially constant as said switching means are moved through said intermediate position to said hot position by rising temperature and to energize said electrical means to cause cooling when the switching means moves to said hot position, said circuit connections coacting with said switching means and switches to continue the operation of said electrical means causing cooling and to diminish the energization of said local heating means upon moving of the switching means out of said hot position due to lowered temperature, the energization of said local heating means remaining substantially diminished until movement of said switching means through said intermediate position upon lowering of the temperature, and to thereupon stop said electrically operated cooling means and reenergize said local heating means said predetermined amount.

12. In a cooling system for a medium, in combination, an electrically controlled cooling means; means responsive to the medium temperature; a plurality of switch means arranged to be sequentially operated by said temperature responsive means; local electric heating means for said temperature responsive means; relay means for controlling said cooling means and having a winding; a first resistor having substantially the same electrical impedance as said winding; a second resistor; and electrical circuits controlled by said sequentially operated switch means so that, at one sequential position due to a relatively low medium temperature, the local heater is energized in series with said first resistor, at another sequential position due to a higher medium temperature the first resistor is deenergized and the winding is energized in series with the heater, energizing the relay winding causing operation of the cooling means, and at a further sequential position corresponding to said one position and caused by the operation of said cooling means lowering the medium temperature, the second resistor is energized in series with said winding and said heater.

13. In a system for controlling the temperature of a medium, in combination, an electrically controlled temperature changing means, means responsive to the medium temperature, a plurality of switch means sequentially operable by said temperature responsive means, local electric heating means for said temperature responsive means, relay means for controlling said temperature changing means and having a winding, means including an electric circuit controlled by said switch means when in a sequential position due to a predetermined temperature for energizing said heater by an electric current of predetermined value, means including a different electric circuit controlled by said switch means when at a different sequential position due to a temperature other than said predetermined temperature for energizing said winding in series with said heater and maintaining the current flow through said local heater at said predetermined value, and means including another electric circuit controlled by said switch means when at a third sequential position due to a temperature caused by operation of said temperature changing means for energizing said winding and for changing the current flow in said local heater in a manner to anticipate a further change in temperature due to operation of said temperature changing means.

GIFFORD I. HOLMES.